US009008909B2

(12) United States Patent
Taki et al.

(10) Patent No.: US 9,008,909 B2
(45) Date of Patent: Apr. 14, 2015

(54) IN-VEHICLE DEVICE (71) Applicant: Toyota Jidosha Kabushiki Kaisha, Toyota-shi, Aichi-ken (JP)

(72) Inventors: Naoki Taki, Okazaki (JP); Takeshi Matsumura, Toyota (JP); Atsushi Watanabe, Anjo (JP); Mayumi Otsuka, Nagoya (JP); Keizoh Kawaguchi, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/108,611

(22) Filed: Dec. 17, 2013

(65) Prior Publication Data

US 2014/0107870 A1 Apr. 17, 2014

Related U.S. Application Data (62) Division of application No. 11/405,465, filed on Apr. 18, 2006, now Pat. No. 8,818,621.

(30) Foreign Application Priority Data

Apr. 20, 2005 (JP) .................................. 2005-122388
Apr. 21, 2005 (JP) .................................. 2005-123707

(51) Int. Cl.
  *G06F 19/00* (2011.01)
  *B60R 99/00* (2009.01)
  *B60R 25/20* (2013.01)
  (Continued)

(52) U.S. Cl.
  CPC ............. *B60R 99/00* (2013.01); *B60R 25/2036* (2013.01); *B60R 25/24* (2013.01); *G07C 9/00174* (2013.01)

(58) Field of Classification Search
  USPC ............... 318/468, 280, 83; 701/29.1, 36, 49; 49/360
  See application file for complete search history.

(56) References Cited

U.S. PATENT DOCUMENTS 6,169,379 B1 * 1/2001 Zhang et al. .................. 318/280
6,600,235 B2 * 7/2003 Mittermeier et al. .......... 307/9.1
(Continued)

FOREIGN PATENT DOCUMENTS

| JP | 2001-132294 | 5/2001 |
|---|---|---|
| JP | 2002-256764 | 9/2002 |
| JP | 2003-090171 | 3/2003 |

(Continued)

OTHER PUBLICATIONS

Office Action from the Japanese Patent Office for JP-2005-123707 dated Dec. 15, 2009.

(Continued)

*Primary Examiner* — Ronnie Mancho
(74) *Attorney, Agent, or Firm* — Finnegan, Henderson, Farabow, Garrett & Dunner, LLP (57) ABSTRACT

In an in-vehicle device which is carried on an automotive vehicle, an operation unit causes the vehicle to execute a predetermined operation in response to a remote control request from a user. A detection unit detects existence of a moving object in a passenger compartment of the vehicle or in areas surrounding the vehicle. An operation inhibition unit inhibits execution of the predetermined operation by the operation unit when existence of the moving object is detected by the detection unit.

3 Claims, 4 Drawing Sheets

(51) Int. Cl.
  *B60R 25/24* (2013.01)
  *G07C 9/00* (2006.01)

(56) References Cited

U.S. PATENT DOCUMENTS

| 6,922,622 B2 * | 7/2005 | Dulin et al. | 701/45 |
| 7,097,226 B2 * | 8/2006 | Bingle et al. | 296/76 |

FOREIGN PATENT DOCUMENTS

| JP | 2003-253939 | 9/2003 |
| JP | 2004-027589 | 1/2004 |
| JP | 2001-98809 | 4/2004 |
| JP | 2004-102939 | 4/2004 |
| JP | 2004-346708 | 12/2004 |
| JP | 2005-0020272 | 3/2005 |

OTHER PUBLICATIONS

Office Action from the Japanese Patent Office for JP 2005-122388 issued Sep. 1, 2009.
Chinese Office Action dated Oct. 19, 2007.
Advisory Action for U.S. Appl. No. 11/405,465 dated Jan. 2, 2014.
Notice of Allowance and Fee(s) Due and Notice of Allowability for U.S. Appl. No. 11/405,465 dated Apr. 24, 2014.

* cited by examiner

FIG. 1

IN-VEHICLE DEVICE

CROSS-REFERENCE TO RELATED APPLICATIONS

This is a division of Application No. 11/405,465, which claims the priority of Japanese Application Nos. 2005-122388, filed Apr. 20, 2005 and 2005-123707, filed Apr. 21, 2005. The contents of each of these applications are incorporated herein by reference.

BACKGROUND OF THE INVENTION

1. Field of the Invention

The present invention generally relates to an in-vehicle device which is carried on an automotive vehicle and causes the vehicle to execute an operation in response to a remote control request from the user. More particularly, the present invention relates to an in-vehicle device which is appropriate for preventing execution of an unsuitable vehicle remote operation.

2. Description of the Related Art

Conventionally, the device or system which is carried on an automotive vehicle and causes the vehicle to execute an operation in response a remote control request from a user is known. For example, see Japanese Laid-Open Patent Application No. 2004-102939.

In the conventional device of Japanese Laid-Open Patent Application No. 2004-102939, the user uses a cellular phone to remotely perform one of vehicle operations including a window closing operation, a hazard lamp turn-off operation, etc.

Moreover, it is known that a power window device for automotive vehicle is provided with a window-closing operation prevention mechanism. For example, see Japanese Laid-Open Patent Application No. 2003-090171 and Japanese Laid-Open Patent Application No. 2004-027589. In the known power window device, when the engagement of a foreign matter with the window glass is detected while the window glass is being raised, the raising operation to raise the window glass is immediately stopped and the driving force of the window motor is reversed in order to start the lowering operation to lower the window glass.

However, in the case of the conventional device of Japanese Laid-Open Patent Application No. 2004-102939, before the requested vehicle operation is performed in response to the remote control request or during execution of the requested operation, it is not checked that there is no moving object in the areas surrounding the vehicle or in the passenger compartment.

If a moving object which can move autonomously, such as a man or animal, exists the inside of the vehicle and the requested remote operation follows a physical movement of a portion of the vehicle, there is a possibility that the movement of the man or animal may interfere with the physical movement of the portion of the vehicle conjointly.

Especially, in a case in which the requested remote operation is the closing operation to physically move a portion of the vehicle and dividing a predetermined open space region into two separate regions, if the moving object moves and interferes with the vehicle portion concerned, there is a possibility that it may become an obstacle of the closing operation.

Examples of the requested remote operation which follows the physical movement of the portion of the vehicle may include the open/closing operations of a power window, a slide roof, a power slide door, a power back door, and a trunk room cover in the vehicle. Examples of the closing operation which physically moves the portion of the vehicle and divides the predetermined open space region into two separate regions may include the closing operations of shutting a power window, a slide roof, a power slide door, a power back door, and a trunk room cover in the vehicle.

In the conventional device mentioned above, when a moving object exists in the areas surrounding the vehicle or in the passenger compartment, there is a possibility that an unsuitable remote operation may be performed.

Or when the man or animal by which a door lock operation cannot be canceled by itself exists in the passenger compartment and the door lock operation is performed by the remote operation, the man or animal will be shut up in the passenger compartment.

Or when a hazard lamp is being blinked to warn the vehicle stop state due to a trouble, to the surrounding of the vehicle, it is preferred for the safety of the vehicle that the person who does not recognize the vehicle stop state is inhibited from performing the remote operation of switching off the hazard lamp.

SUMMARY OF THE INVENTION

An object of the present invention is to provide an improved in-vehicle device in which the above-mentioned problems are eliminated.

Another object of the present invention is to provide an in-vehicle device which is capable of appropriately preventing execution of an unsuitable vehicle remote operation when it is requested.

In order to achieve the above-mentioned objects, the present invention provides an in-vehicle device which is carried on an automotive vehicle, the in-vehicle device comprising: a first operation unit causing the vehicle to execute a first predetermined operation in response to a remote control request from a user; a detection unit detecting existence of a moving object in a passenger compartment of the vehicle or in areas surrounding the vehicle; and an operation inhibition unit inhibiting execution of the first predetermined operation by the first operation unit when existence of the moving object is detected by the detection unit.

The above-mentioned in-vehicle device of the invention may be configured so that the in-vehicle device further comprises an operation stop unit stopping, if the remote control request from the user indicates, as the first predetermined operation, a closing operation of the vehicle door to divide an open space region into two separate regions by moving a portion of the vehicle physically, execution of the closing operation when existence of the moving object is detected by the detection unit during execution of the closing operation.

The above-mentioned in-vehicle device of the invention may be configured so that the operation stop unit is provided to allow, if the vehicle has a function of driving movement of the portion of the vehicle in an opposite direction when it is detected that the portion of the vehicle contacts a foreign matter during execution of the closing operation, the execution of the closing operation without stopping the execution of the closing operation when existence of the moving object is detected by the detection unit during the execution of the closing operation.

The above-mentioned in-vehicle device of the invention may be configured so that the in vehicle device further comprises: a second operation unit causing the vehicle to execute a second predetermined operation in response to the remote control request from the user, the second predetermined operation including a vehicle operation indicated by the remote control request from the user, and a vehicle state monitoring operation to check if predetermined conditions for execution of the vehicle operation are satisfied; a second operation inhibition unit inhibiting execution of the vehicle operation indicated by the remote control request when existence of the moving object is detected by the detection unit; and an operation permission unit permitting the execution of the vehicle operation when a predetermined condition is satisfied.

The above-mentioned in-vehicle device of the invention may be configured so that the operation permission unit is provided to permit, if the remote control request from the user indicates as the vehicle operation an operation of an air-conditioner, execution of the operation of the air-conditioner by setting the air-conditioner in a given mode.

The above-mentioned in-vehicle device of the invention may be configured so that the operation permission unit is provided to permit, if the remote control request from the user indicates as the vehicle operation an operation of lighting a hazard lamp, execution of the operation of lighting the hazard lamp.

The above-mentioned in-vehicle device of the invention may be configured so that the operation permission unit is provided to permit, if the remote control request from the user indicates as the vehicle operation a cancellation operation to cancel execution of a previously requested remote operation, execution of the cancellation operation.

The above-mentioned in-vehicle device of the invention may be configured so that the operation permission unit is provided to permit, if the remote control request from the user indicates as the vehicle operation an operation permitted by a passenger in a passenger compartment of the vehicle, execution of the operation permitted by the passenger.

The above-mentioned in-vehicle device of the invention may be configured so that the in-vehicle device comprises a switching unit for specifying the operation permitted by the passenger in the passenger compartment.

The above-mentioned in-vehicle device of the invention may be configured so that the in-vehicle device further comprises: a voice output unit outputting a voice message to check if execution of a predetermined remote operation is permitted, to the passenger in the passenger compartment; and a determination unit determining whether the passenger in the passenger compartment has permitted the predetermined remote operation, by receiving and analyzing a reply voice of the passenger to the voice message outputted by the voice output unit.

The above-mentioned in-vehicle device of the invention may be configured so that the operation permission unit is provided to permit, if the remote control request is received from the user and it is detected that a passenger or animal in the passenger compartment is sleeping, execution of the vehicle operation.

According to the present invention, it is possible to provide an in-vehicle device which can appropriately prevent execution of an unsuitable vehicle remote operation.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of an embodiment of the present invention with reference to the accompanying drawings.

Figure 1:
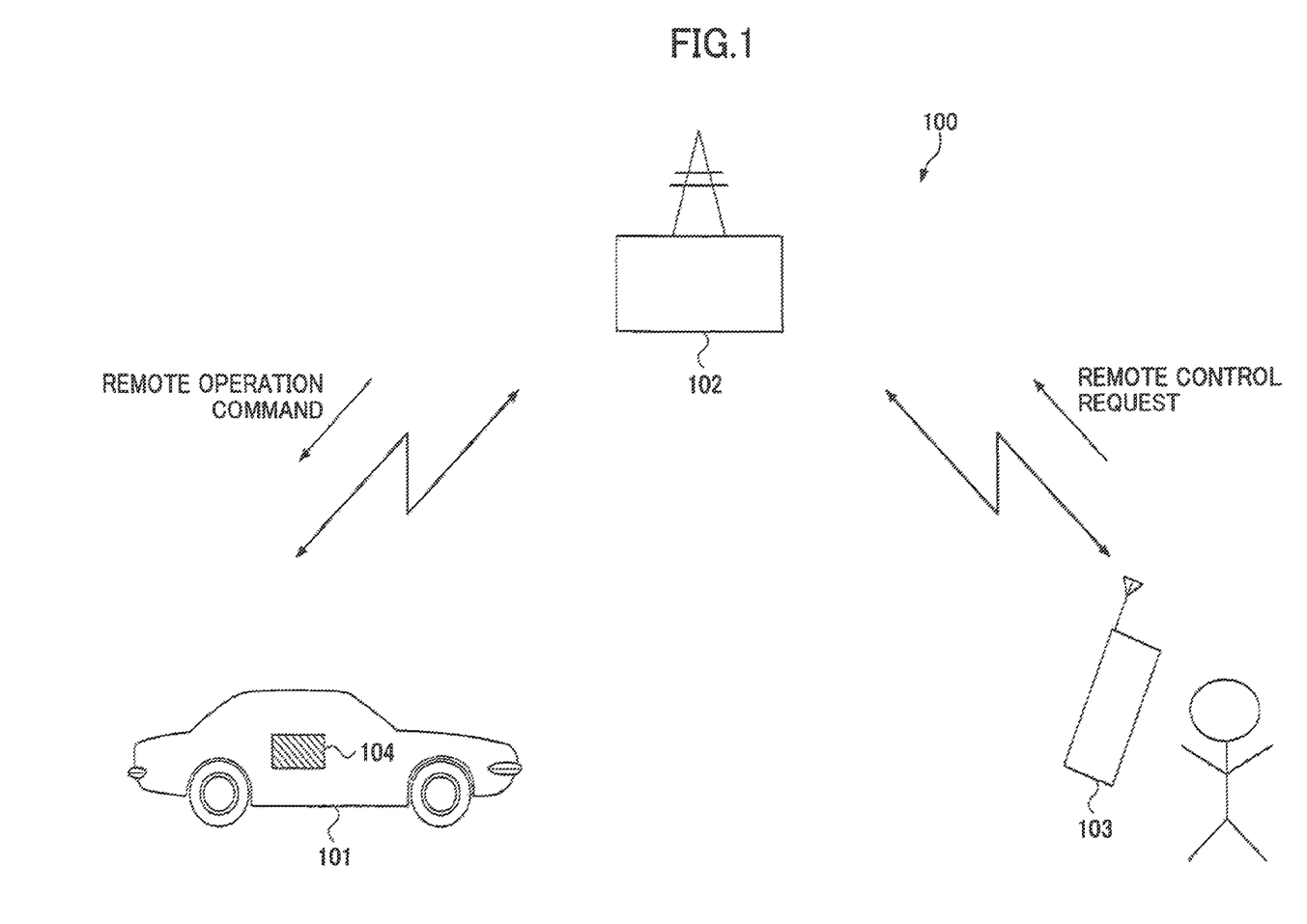
FIG. 1 is a diagram showing the composition of a vehicle remote control system in which an in-vehicle device of the invention is embodied.

FIG. 1 shows the composition of a vehicle remote control system in which an in-vehicle device of the invention is embodied.

The vehicle remote control system 100 of this embodiment comprises an automotive vehicle 101, a center 102, and a communication terminal 103. The vehicle 101 is the target of remote operation. The center 102 is a communication station which is managed by, for example, the vehicle manufacturer (maker), the automobile retail store (dealer), or the special contractor. The communication terminal 103 is carried by the vehicle user (owner).

When a remote operation is requested by the user using the communication terminal 103, the center 102 transmits a remote operation command to the in-vehicle device 104 of the vehicle 101.

The in-vehicle device 104 performs the requested vehicle operation in response to the operation command received from the center 102.

The communication terminal 103 carried by the user is, for example, a mobile phone which is capable of establishing a connection with the Internet. Alternatively, the communication terminal 103 may be a computer terminal provided with a communication function, such as a FDA or notebook PC.

Next, the composition of an in-vehicle device in an embodiment of the invention will be explained with reference to FIG. 2.

Figure 2:
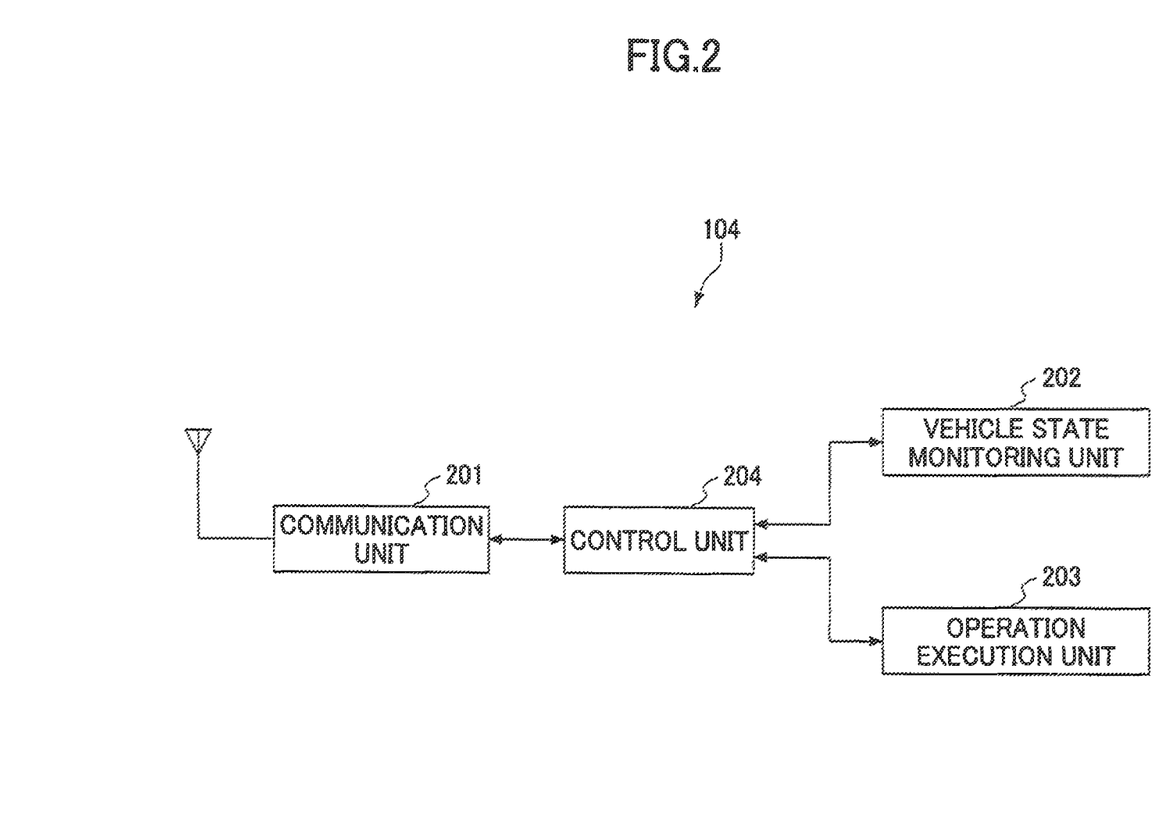
FIG. 2 is a block diagram showing the composition of an in-vehicle device in an embodiment of the invention in the vehicle remote control system.

FIG. 2 shows the composition of the in-vehicle device 104 of this embodiment. As shown in FIG. 2, the in-vehicle device 104 comprises a communication unit 201 which receives an operation command from the center 102 using wireless communications.

It is preferred that the communication unit 201 is designed to transmit to the center 102 a message that the requested the vehicle operation is completed, after the execution of the requested vehicle operation is completed.

The in-vehicle device 104 comprises a vehicle state monitoring unit 202 which supervises and detects the vehicle state in which a moving object exists in the areas surrounding the vehicle or in the passenger compartment, or the vehicle station in which an opening or closing operation of a door is performed. For example, the vehicle state monitoring unit 202 uses an imaging unit (for example, a camera) which takes a still picture or a moving picture, to detects existence of a man or animal in the areas surrounding the vehicle or in the passenger compartment.

The in-vehicle device 104 comprises an operation execution unit 203 which performs any of various vehicle operations, including the opening and closing operations of a power window or the like, and the lighting on and off operations of a hazard lamp or the like.

The in-vehicle device 104 further comprises a control unit 204 which generally controls the above-mentioned elements of the in-vehicle device 104. For example, the control unit 204 is constituted by an ECU (electronic control unit).

In the present embodiment, the remote control request from the user may include (1) the passive operation to deal with the lighting of a hazard lamp or the opening of a window which the user has forgotten at the time of parking of the vehicle 101 (at the time of IG OFF). If such problem arises and is detected by the in-vehicle device 104, the user is notified by the center 102 (for example, by e-mail) and sends the remote control request in response to that notice in order to take suitable countermeasure (for example, lighting off of the hazard lamp, or shutting of the window). And the remote control request from the user may include (2) the active operation (for example, the vehicle finder function used for the user to discover his own vehicle in a large-scale parking lot). In the latter case, the user sends positively the remote control request without receiving any notice from the center side, and the in-vehicle device 104 carries out the remote control request to perform the operation of lighting the hazard lamp.

Figure 3:
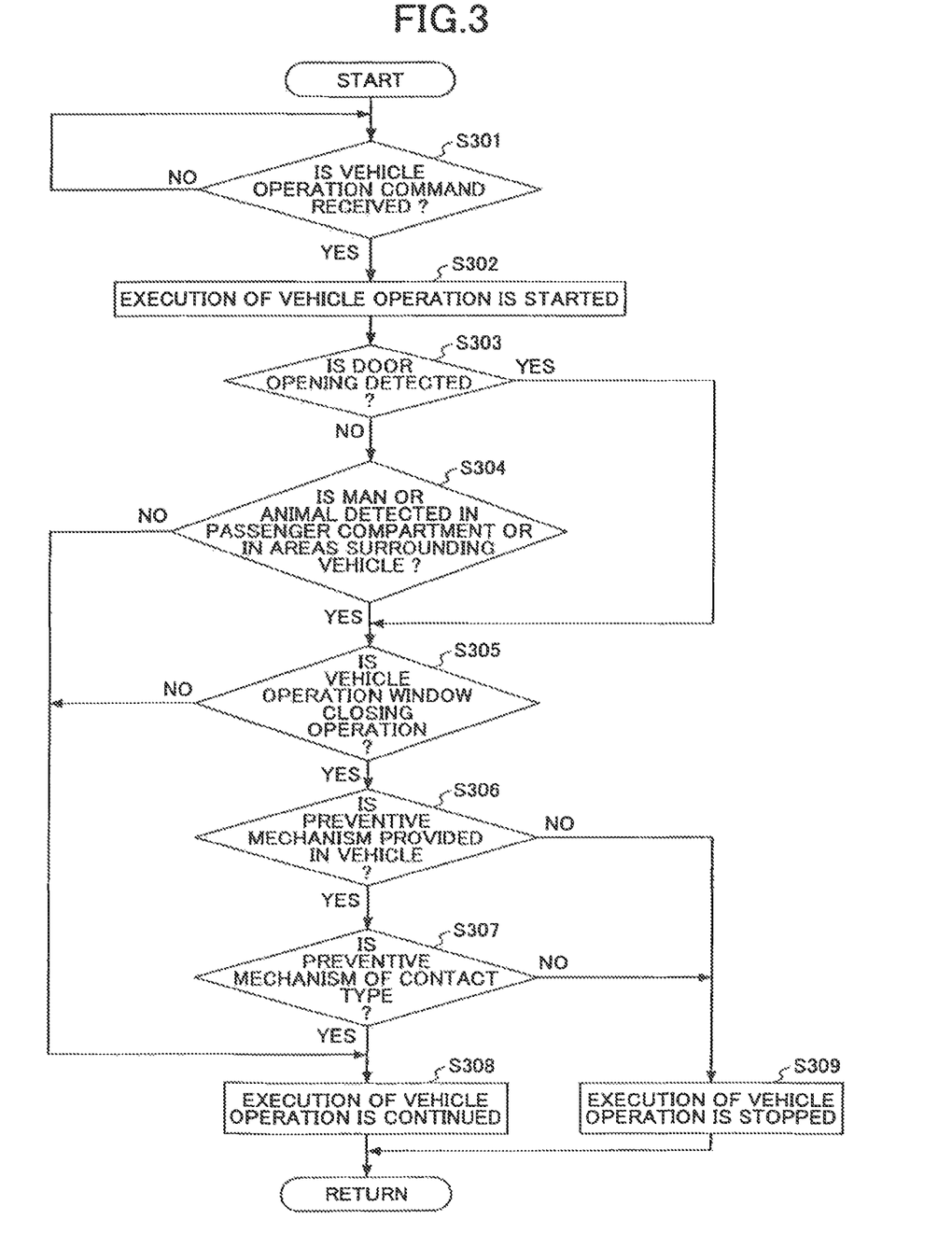
FIG. 3 is a flowchart for explaining the processing performed by the in-vehicle device of the present embodiment in the vehicle remote control system.

Next, the processing which is performed by the in-vehicle device 104 in this embodiment will be explained with reference to FIG. 3. FIG. 3 is a flowchart for explaining the processing performed by the in-vehicle device of this embodiment in the vehicle remote control system.

Upon start of the processing of FIG. 3, the in-vehicle device 104 is in a standby state in which a remote operation command which requests the in-vehicle device 104 to execute a vehicle operation on the vehicle 101 is received from the center 102 (S301).

When the communication unit 201 receives the operation command from the center 102 (YES of S301), the control unit 204 causes the vehicle state monitoring unit 202 to check that all of the predetermined preconditions for the vehicle operation execution (for example, the key is not inserted, the door is not open, and no passenger is in the passenger compartment) are satisfied. After the checking, the control unit 204 causes the operation execution unit 203 to start execution of the vehicle operation in response to the received operation command (S302).

During the execution of the vehicle operation requested by the user via the center 102, the control unit 204 detects whether the stop conditions under which the above-mentioned preconditions are not satisfied are satisfied.

As the stop conditions in this embodiment, the control unit 204 detects whether the door is open (S303), and detects whether a moving object (or a man or animal) exists in the areas surrounding the vehicle or in the passenger compartment (S304).

The detection of door opening of S303 is performed in order to detect existence of a person nearby the vehicle. If the door is open, then it can be assumed that a person is about to enter the passenger compartment of the vehicle or is about to leave the vehicle. The object of the step S303 is essentially the same as that of the step S304.

When the vehicle state monitoring unit 202 detects that the door is open (YES of S303), it is determined that the stop conditions are satisfied, and then the control unit 204 progresses to S305.

When it is detected that a moving object exists in the areas surrounding the vehicle or in the passenger compartment (YES of S304), it is determined that the stop conditions are satisfied, and then the control unit 204 progresses to S305.

That is, if either of the stop conditions are satisfied, the control unit 204 progresses to S305. If none of the stop conditions are satisfied (NO of S304), the control unit 204 progresses to S308 so that the execution of the vehicle operation is continued.

When it is determined that either of the stop conditions are satisfied (YES of S303 or YES of S304), the control unit 204 determines whether the vehicle operation currently performed in response to the remote control request from the user is a closing operation of moving a portion of the vehicle physically and dividing a predetermined open space region into two separate regions (S305).

The closing operation of moving the vehicle portion physically and dividing the open space region into two separate regions is, for example, a closing operation of closing the power window, the slide roof, the power slide door, the power back door or the trunk room cover.

When the vehicle operation under execution is a door lock operation, a hazard lamp lighting, etc. and it is not the above-mentioned closing operation (NO of S305), it is determined that, even if the man or the animal exists in the areas surrounding the vehicle or in the passenger compartment, there is no possibility that the man or the animal may interfere with the vehicle portion. Then, the control unit 204 progresses to S308, so that the execution of the operation concerned is continued.

On the other hand, when the vehicle operation under execution is the above-mentioned closing operation (YES of S305), the control unit 204 detects whether the vehicle is provided with a preventive mechanism which drives the movement of the portion of the vehicle in the opposition direction when it is detected that the portion of the vehicle contacts a foreign matter during the closing operation (S306).

When it is detected that the vehicle is not provided with the above-mentioned preventive mechanism (NO of S306), the control unit 204 causes the operation execution unit 203 to stop the execution of the vehicle operation under execution (S309). This is because it is determined that there is a possibility that the detected person or animal may interfere with the vehicle portion (the window glass or the door) which is moved by the closing operation under execution. The purpose of stopping the execution of the vehicle operation under execution of S309 is to avoid such a situation certainly beforehand.

On the other hand, when it is detected that the vehicle is provided with the above-mentioned preventive mechanism (YES of S306), the control unit 204 determines whether the preventive mechanism is of the contact type (S307). In the case of a contact type preventive mechanism, it detects the physical contact of the vehicle portion with a foreign matter and starts driving the movement of the vehicle portion in the opposition direction when it is detected. In the case of a non-contact type preventive mechanism, it detects presence of a foreign matter by using laser light or infrared radiation when the foreign matter approaches within a predetermined distance of the vehicle portion, and starts driving the movement of the vehicle portion in the opposite direction when it is detected.

When the preventive mechanism is of the contact type, the driving of the movement of the vehicle portion in the opposition direction is started only after the physical contact of the vehicle portion with the foreign matter is detected. Thus, there is a situation in which the portion of the vehicle is about to contact the moving object when existence of the moving object is detected. In such a situation, if the movement of the vehicle portion is stopped immediately after the existence of the moving object is detected, then there is a possibility that the preventive mechanism may be stopped in an improper position where the movement of the moving object is restricted.

In order to avoid occurrence of such a situation, the execution of the vehicle operation should be continued until the portion of the vehicle actually contacts the moving object, and the preventive mechanism is allowed to be moved to a proper position where the movement of the moving object is not restricted.

Accordingly, when the preventive mechanism is of the contact type (YES of S307), the closing operation should not be stopped immediately, and the control unit 204 causes the operation execution unit 203 to continue the execution of the vehicle operation (S308).

On the other hand, when the preventive mechanism is of the non-contact type, there is no situation in which the portion of the vehicle is about to contact the moving object when existence of the moving object is detected.

Accordingly, when it is detected that the preventive mechanism is of the non-contact type (NO of S307), the control unit 204 causes the operation execution unit 203 to stop the execution of the vehicle operation under execution (S309).

According to this embodiment, when existence of a moving object in the areas surrounding the vehicle or in the passenger compartment is detected while the vehicle operation to close the window glass or the door is performed by the remote operation, the execution of the vehicle operation concerned is stopped in principle. This allows occurrence of the interference to be avoided, and the flexibility of the movement of the man or animal (the moving object) after the stop operation is taken into consideration.

When the vehicle is equipped with the preventive mechanism of the contact type, the execution of the vehicle operation concerned is not stopped exceptionally. It is possible to appropriately stop the vehicle operation under execution according to the kind of the requested vehicle operation and the presence of the preventive mechanism and its kind, and execution of unsuitable remote operation can be prevented appropriately.

Figure 4:
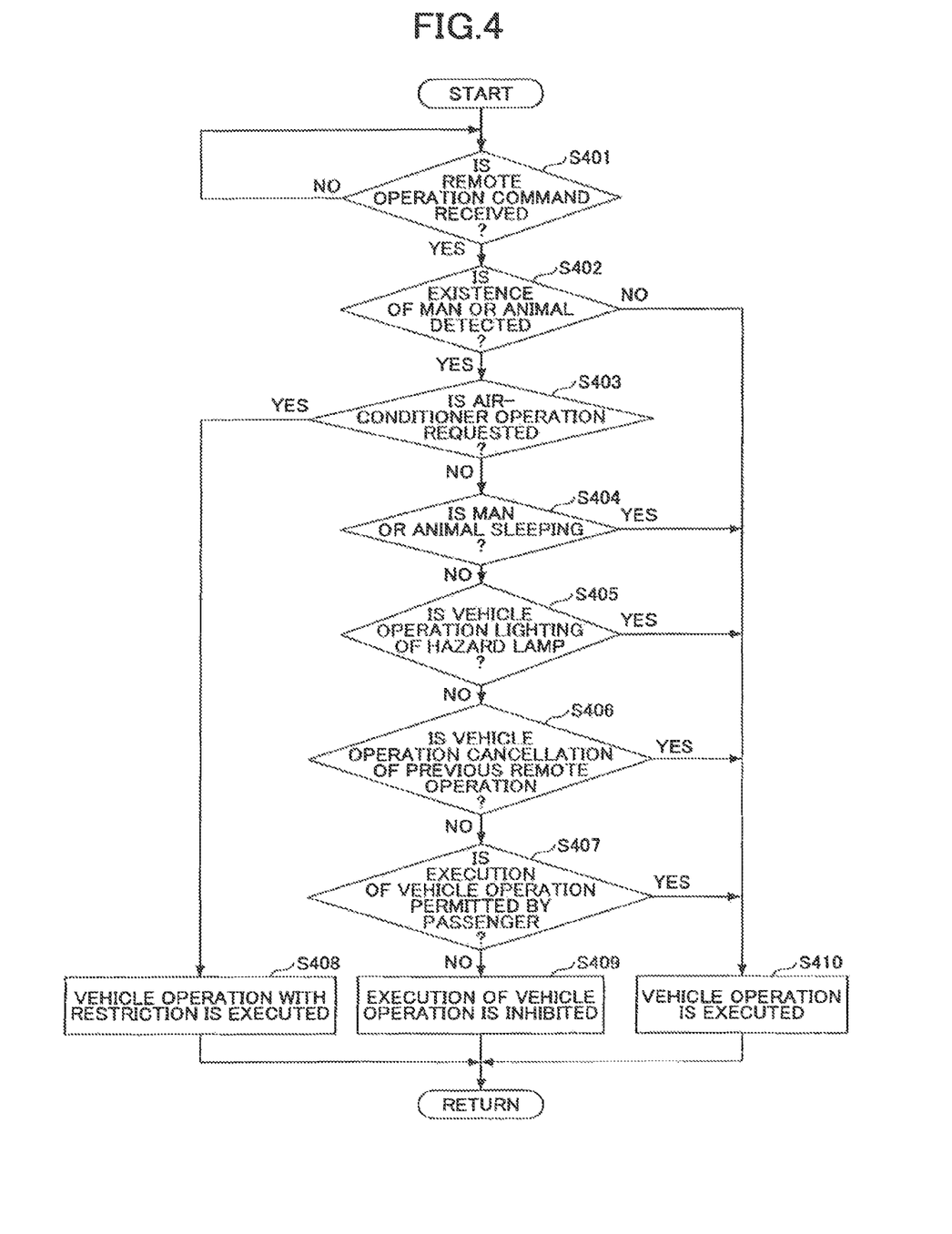
FIG. 4 is a flowchart for explaining the processing performed by the in-vehicle device in another embodiment of the invention in the vehicle remote control system.

Next, FIG. 4 is a flowchart for explaining the processing performed by the in-vehicle device in another embodiment of the invention in the vehicle remote control system.

Upon start of the processing of FIG. 4, the in-vehicle device 104 is in a standby state in which a remote operation command which requests the in-vehicle device 104 to execute a vehicle operation is received from the center 102 (S401).

When the communication unit 201 receives the operation command from the center 102 (YES of S401"), the control unit 204 causes the vehicle state monitoring unit 202 to check if all of the predetermined preconditions for the vehicle operation execution (for example, IG OFF, ACC OFF, the door closed, and the key is not in the passenger compartment) are satisfied. After the checking, the control unit 204 determines whether a moving object (a man or animal) exists in the areas surrounding the vehicle or in the passenger compartment (S402).

When no moving object is detected (NO of S402"), it is determined that there is no possibility that an undesired influence is given to the man or animal even if the vehicle operation is performed, and the control unit 204 causes the operation execution unit 203 to execute the vehicle operation requested by the user with the remote control request as it is (S410).

On the other hand, when existence of a moving object in the areas surrounding the vehicle or in the passenger compartment is detected (YES of S402), the control unit 204 determines whether the vehicle operation requested by the user with the remote control request is an operation of an air-conditioner (AC) (S403).

When the requested remote operation is an operation of an air-conditioner (YES of S401), the control unit 204 causes the operation execution unit 203 to execute the air-conditioner operation with the restriction (S408). In this case, consideration should be taken into a possibility that the user who has requested the vehicle operation concerned from a remote place does not fully grasp the current state of the vehicle.

Specifically, in the step S408, the control unit 204 causes the operation execution unit 203 to set compulsorily the air-conditioner in the AUTO mode so that the internal space of the passenger compartment may not be cooled too much or may not be warmed too much. In other words, the specification of the air conditioning/heating and the specification of the preset temperature by the user will be disregarded.

It is preferred that when existence of a moving object in the areas surrounding the vehicle or in the passenger compartment indefinite or unclear, the execution of the vehicle operation with the restriction be selected for safety of the vehicle.

Moreover, it is preferred that, when the air conditioner is automatically set in the AUTO mode in the step S408, a notification that the air-conditioner is set in the AUTO mode is transmitted to the user through the center 102.

The in-vehicle device 104 of this embodiment may be configured so that when the air conditioner is automatically set in the AUTO mode in the step S408, changing the setting of the air conditioner by a subsequent remote operation is inhibited so that the internal space of the passenger compartment may not be cooled too much or may not be warmed too much accidentally. The in-vehicle device 104 of this embodiment may be configured so that, when the user is still going to change the setting (the AUTO mode) of the air conditioner, the user is requested to confirm sufficiently that the air conditioner is automatically set in the AUTO mode because the existence of the moving object is detected as mentioned above.

When the air-conditioner is set in the AUTO mode in the step S408, or when no moving object is detected but the air-conditioner is operated in the AUTO mode in the step S410 according to the specification from the user, it is preferred that the control unit 204 causes the vehicle state monitoring unit 202 to detect and check: (a) the opening/closing states of the door, the trunk room cover, the window and the styled roof; (b) the external temperature and the internal temperature of the passenger compartment; and (c) the number of passengers and the passenger positions.

For example, regarding the above item (a), if any of the door, the trunk room cover, the window and the styled roof is open, the effect of the air-conditioner will worsen, the time for changing the internal space of the passenger compartment to the requested temperature will be longer than needed, and the power consumption will also increase.

To obviate the problem, it is preferred that, when it is detected that any of the components in the above item (a) is open, the control unit 204 causes the communication unit 201 to transmit a warning message to the user via the center 102, and requests the user to perform a remote operation to shut the open window etc.

Regarding the above item (b), depending on a difference between the external temperature and the internal temperature, there is a case in which the external air should be introduced without operating the air-conditioner. The introduction of the external air into the vehicle would change the internal space of the passenger compartment to the requested temperature earlier. Thus, it is preferred that the control unit 204 controls the air-conditioner through the operation execution unit 203, taking into consideration a difference between the external temperature and the internal temperature.

Regarding the above item (c), it is preferred that the control unit 204 controls the wind flow rate and the wind direction of the air-conditioner in accordance with the number of passengers and the passenger sitting positions on the seats.

Moreover, the control unit 204 may control the air-conditioner according to the performance or optional equipment of the air-conditioner so that the requested temperature is reached in a desirable mode. For example, when the air-conditioner is equipped with the dehumidifying mode and the minus-ion creating mode, these modes may be incorporated in the AUTO mode suitably. When the air-conditioner not equipped with the AUTO mode, the ON/OFF switching control may be carried out.

Otherwise, the in-vehicle device 104 of this embodiment may be configured so that calendar information and weather report information are acquired using wireless communications, a future temperature change is predicted from the acquired information, and the control 204 controls the air-conditioner according to the predicted temperature change.

On the other hand, when the requested remote operation is not an operation of the air-conditioner (NO of S403), the control unit 204 determines through the vehicle state monitoring unit 202 whether the moving object (the man and/or the animal) the existence of which is detected is sleeping (S404). For example, this determination may be performed by using the technique in which detection of a moving object is performed continuously for a short time, and it is detected whether the detected object is moving or not. If it is detected that the detected object does not move for a predetermined time, then it is determined that the object is sleeping.

When it is determined that the man or animal the existence of which is detected is sleeping (YES of S404), it is determined that there is no possibility that an undesired influence is given to the man or animal even if the vehicle operation is performed, and the control unit 204 causes the operation execution unit 203 to execute the vehicle operation requested by the user with the remote control request as it is (S410).

On the other hand, when is determined that the man or animal the existence of which is detected is not sleeping (NO of S404), the control unit 204 determines whether the vehicle operation requested by the user with the remote control request is a lighting operation of the hazard lamp (S405).

When the requested remote operation is the lighting operation of the hazard lamp (YES of S405), the control unit 204 causes the operation execution unit 203 to execute the lighting operation of the hazard lamp (S410). This is because it is determined that there is no possibility that an undesired influence is given to the man or animal even if the vehicle operation is performed, and the lighting operation of the hazard lamp is useful for warning the neighboring vehicles in the areas surrounding the vehicle.

On the other hand, when the requested remote operation is not the lighting operation of the hazard lamp (NO of S405), the control unit 204 determines whether the vehicle operation requested by the user with the remote control request is a cancellation operation to cancel the previously requested remote operation (S406).

When the requested remote operation is the cancellation operation (YES of S406), the control unit 204 causes the operation execution unit 203 to execute the cancellation operation of the previously requested remote operation (S410). This is because it is determined that there is no possibility that an undesired influence is given to the man or animal even if the vehicle operation is performed, and this operation causes the in-vehicle device 104 to return to the previous state before the previous remote operation is performed.

On the other hand, when the requested remote operation is not the cancellation operation (NO of S406), the control unit 204 determines whether the vehicle operation requested by the user with the remote control request is an operation which is permitted by the passenger the existence of which in the passenger compartment is detected (S407).

One of the following methods (A) to (C) can be used as a method of acquiring the operation which is permitted by the passenger in the passenger compartment.

(A) When the remote operation is requested by the user, an audio output device, such as a loudspeaker, is caused to output a voice message indicating "May the vehicle operation be executed?" to the internal space of the passenger compartment. A reply voice of the passenger (for example, "NO") in response to the voice message is collected by using a voice-collecting device, such as a microphone, analysis processing of the reply voice is performed, and it is determined whether the reply voice of the passenger is affirmative or negative, based on the result of the analysis. When the passenger's reply voice is affirmative, it is determined that the requested remote operation is permitted by the passenger.

(B) Similar to the above item A, when the remote operation is requested by the user, the audio output device, such as a loudspeaker, is caused to output a voice message to the internal space of the passenger compartment. By such a voice message, the passenger is requested to set a switch device, provided in the passenger compartment, to the ON or OFF position according to the reply of the passenger, and it is determined whether the reply of the passenger is affirmative or negative, based on the switch position. When the passenger's replay is affirmative, it is determined that the requested remote operation is permitted by the passenger.

(C) Similar to the above item B, the passenger is requested to set the switch device to the ON or OFF position, in advance, before the remote operation is requested, and it is determined whether the reply of the passenger is affirmative for permission of the predetermined operation, based on the switch position at the time of requesting the remote operation.

In the case of the above items (A) and (B), the communication of a mobile phone may be used to transmit the voice message to the passenger. And the user may speak to the passenger directly. In the case of the above item (A), the reply voice of the passenger may be transmitted to a communication terminal of the user by using the communication of a mobile phone, so that the user can check the reply voice of the passenger by himself.

When the requested remote operation is the operation which is permitted by the passenger (YES of S407), the control unit 204 causes the operation execution unit 203 to execute the vehicle operation concerned (S410). This is because it is determined the passenger in the passenger compartment is already ready for the execution of the vehicle operation concerned.

On the other hand, when the requested remote operation is not the operation which is not permitted by the passenger, or when any passenger does not exist in the passenger compartment (NO of S407), the control unit 204 inhibits the execution of the vehicle operation concerned (S409). This is because it is determined that the execution of the vehicle operation requested by the user with the remote control request is not permitted by the passenger.

According to the present embodiment, when a moving object in the areas surrounding the vehicle or in the passenger compartment is detected at the time of requesting the remote vehicle operation, the execution of the requested vehicle operation is inhibited in principle. However, when it is determined that execution of the requested vehicle operation will not cause an undesired influence on the man or animal the existence of which is detected, the execution of the vehicle operation concerned is permitted. Thus, it is possible to prevent appropriately execution of an unsuitable remote vehicle operation, while the convenience of remote vehicle operation is maintained.

In the above-mentioned embodiments, the case in which the user requests the remote operation to the vehicle through the center has been described. However, the present invention is not limited to the above embodiments, and the vehicle remote control system may be configured so that the user communication terminal and the in-vehicle device carry out direct communication, without using the center.

In the above-mentioned embodiment of FIG. 4, when the existence of a moving object is detected and all of the conditions in the steps S403-S407 are not satisfied, the execution of the requested vehicle operation is inhibited (the requested vehicle operation is canceled). However, the present invention is not limited to this embodiment. In what situations the execution of the requested vehicle operation is inhibited or permitted, or the execution of the requested vehicle operation with the restriction is permitted can be arbitrarily set up by taking into consideration the person or animal and the characteristics or the features of the requested vehicle operation.

The present invention is applicable to the in-vehicle device which is carried on the vehicle and causes the vehicle to execute the operation requested by the user with the remote control request. The appearance, the weight, the size and the running performance of the vehicle in which the in-vehicle device is installed are not limited.

The present invention is not limited to the above-described embodiments, and variations and modifications may be made without departing from the scope of the invention.

Further, the present application is based upon and claims the benefit of priority of Japanese patent application No. 2005-122388, filed on Apr. 20, 2005, and Japanese patent application No. 2005-123707, filed on Apr. 21, 2005, the entire contents of which are incorporated herein by reference.

What is claimed is:

1. An in-vehicle device which is carried on an automotive vehicle, comprising:
    a first operation unit causing the vehicle to execute a first predetermined operation in response to a remote control request from a user;
    a detection unit detecting existence of a moving object in a passenger compartment of the vehicle or in areas surrounding the vehicle; and
    an operation inhibition unit inhibiting execution of the first predetermined operation by the first operation unit when existence of the moving object is detected by the detection unit.

2. The in-vehicle device according to claim 1 further comprising an operation stop unit stopping, if the remote control request from the user indicates, as the first predetermined operation, a closing operation of the vehicle door to divide an open space region into two separate regions by moving a portion of the vehicle physically, execution of the closing operation when existence of the moving object is detected by the detection unit during execution of the closing operation.

3. The in-vehicle device according to claim 2 wherein the operation stop unit is provided to allow, if the vehicle has a function of driving movement of the portion of the vehicle in an opposite direction when it is detected that the portion of the vehicle contacts a foreign matter during execution of the closing operation, the execution of the closing operation without stopping the execution of the closing operation when existence of the moving object is detected by the detection unit during the execution of the closing operation.

* * * * *